United States Patent [19]

Becker et al.

[11] 4,284,097
[45] Aug. 18, 1981

[54] IN LINE BACK FLOW PREVENTER

[75] Inventors: Bernard B. Becker, Belmont; John K. Bowman, Brighton; Cyril A. Randall, Belmont, all of Mass.

[73] Assignee: Amtrol Inc., West Warwick, R.I.

[21] Appl. No.: 58,566

[22] Filed: Jul. 18, 1979

Related U.S. Application Data

[63] Continuation-in-part of Ser. No. 890,964, Mar. 28, 1978, Pat. No. 4,232,704.

[51] Int. Cl.³ .................... F16K 15/06; F16K 45/00
[52] U.S. Cl. .................................. 137/218; 137/512; 137/541; 137/454.2
[58] Field of Search ............... 137/215, 217, 218, 116, 137/512, 512.3, 541, 362, 454.2, 454.4; 85/8.8

[56] References Cited

U.S. PATENT DOCUMENTS

| | | |
|---|---|---|
| 2,182,278 | 12/1939 | Brauer . |
| 2,389,413 | 11/1945 | Carlton . |
| 2,503,424 | 4/1950 | Snyder ............................ 137/218 |
| 2,706,488 | 4/1955 | Harrington . |
| 3,347,266 | 10/1967 | Hansen ........................ 137/454.2 X |
| 3,401,436 | 9/1968 | Bradshaw ...................... 85/8.8 X |
| 3,448,763 | 6/1969 | Curtiss . |
| 3,636,968 | 1/1972 | Tine . |
| 3,747,621 | 7/1973 | Tine . |
| 3,906,987 | 9/1975 | Rushforth ....................... 137/218 |
| 3,996,962 | 12/1976 | Sutherland ..................... 137/527.4 |
| 4,054,153 | 10/1977 | Guyton . |
| 4,090,527 | 5/1978 | Sutherland . |
| 4,129,144 | 12/1978 | Andersson et al. ................. 137/541 |

FOREIGN PATENT DOCUMENTS 664769 5/1936 Fed. Rep. of Germany .
2252517 11/1974 France .

OTHER PUBLICATIONS

Toro Backflow Preventers, 1½" and 2", Double Check Model, Toro Technology Center, No. 825-1013.

*Primary Examiner*—William R. Cline
*Attorney, Agent, or Firm*—Fisher, Christen & Sabol

[57] ABSTRACT

A back flow preventing device is disclosed which prevents the reverse flow of water from a point of use into a water supply system. The device has a casing with coaxially aligned inlet and outlet openings, and containing coaxially aligned inlet and outlet check valves. The coaxial alignment of the inlet and outlet openings, and of the inlet and outlet check valves serves to minimize the pressure drop through the device. Between the inlet and outlet check valves is a diaphragm actuated relief valve which opens to drain the passage between the check valves if they should malfunction or if there is a drop in the supply line pressure sufficient to cause actual or potential reverse flow back toward the supply line. The internally-located inlet and outlet check valves are each removably secured in place by internally-located retaining rings.

12 Claims, 6 Drawing Figures

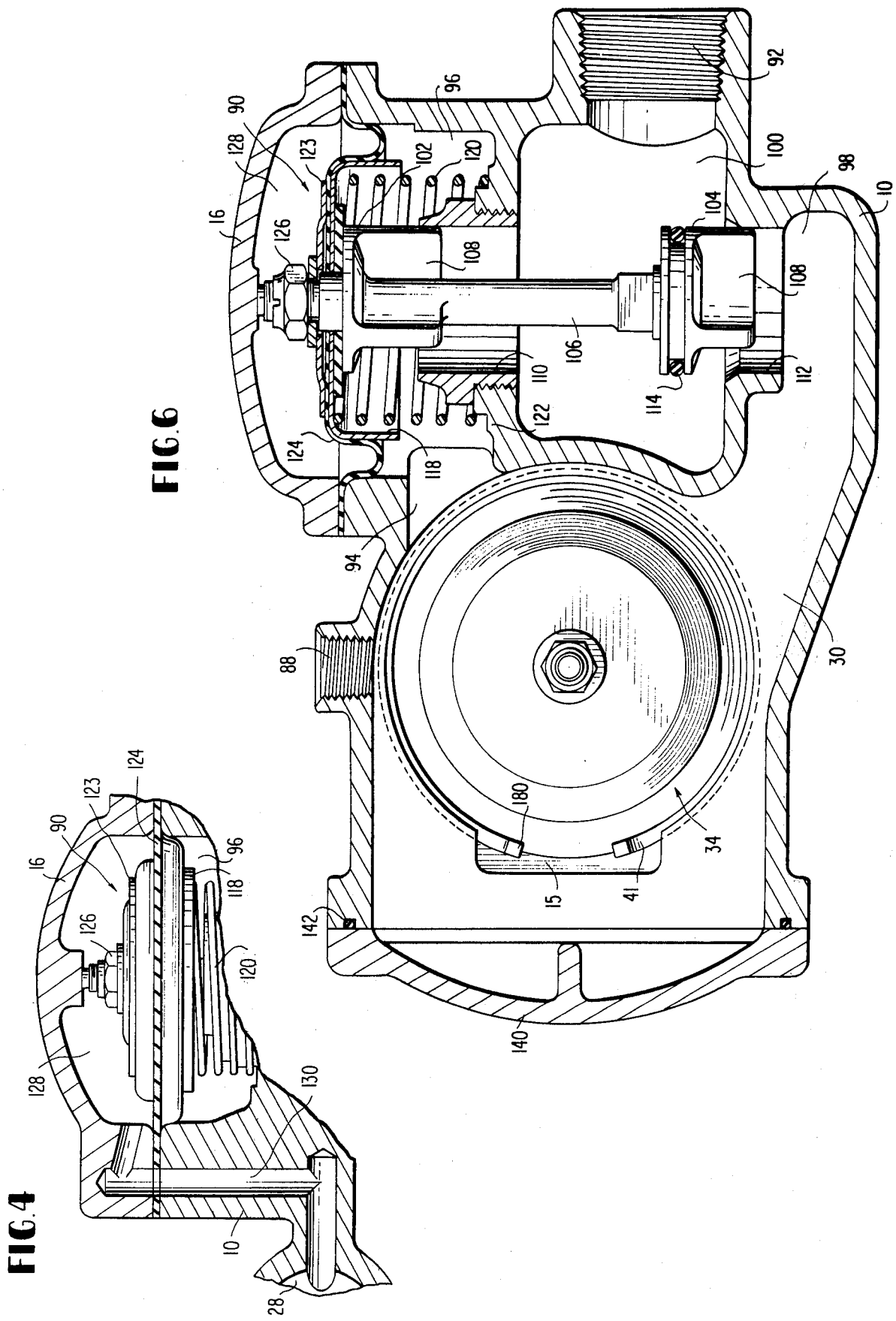

IN LINE BACK FLOW PREVENTER

This application is a continuation-in-part of U.S. application Ser. No. 890,964, filed on Mar. 28, 1978 now U.S. Pat. No. 4,232,704.

BACKGROUND OF THE INVENTION

1. Field of the Invention

This invention relates to in-line back flow preventing devices.

2. Prior Art

Back flow preventers are required equipment in all potable water supply lines where there is any possibility of reverse flow back into the supply line due to changing pressures in the supply and outlet lines.

Back flow preventers now in use generally include two check valves arranged in series so that water under sufficient pressure on the supply side will cause the valves to open and allow water to flow freely to the outlet pipes. It is also customary practice to include in the passage between the check valves, a relief valve which will automatically open should there be any flow in the reverse direction due to a drop in the supply line pressure and failure of one or both check valves to hold against higher outlet pressure. With the relief valve open, any contaminated or polluted water passing the downstream check valve in the reverse direction will be drained to atmosphere and thereby be prevented from entering the supply line.

The following U.S. Pat. Nos. are illustrative of the present state of the art: 2,389,413; 2,503,424; 3,448,763; 3,636,968; 3,747,621; 4,054,153; 4,129,144; 2,706,488; and 4,090,527.

BROAD DESCRIPTION OF THE INVENTION

An object of this invention is to provide an improved back flow preventer which minimizes the pressure drop between the inlet and the outlet, thereby permitting a higher flow capacity for a given valve size. A further object of this invention is to provide a simpler construction of back flow preventer which renders maintenance easier. Another object of this invention is to provide an improved back flow preventer which has in line check valves with one or more removable casing portions. Another object of this invention is to provide an improved in line back flow preventer having reduced dimension, as compared to prior art devices, which allows installation and removal of the check valves from the central chamber via a casing port, and which have securing means for the check valves located in the central chamber. Other objects and advantages of this invention are set out herein or are obvious herefrom to one ordinarily skilled in the art.

The objects and advantages of this invention are achieved by the apparatus and methods of this invention.

This invention is an improvement over the prior art devices insofar as it provides a back flow preventer which minimizes the pressure drop between the inlet and outlet, thereby permitting a higher flow capacity for a given valve size. At the same time this invention provides a simpler construction which renders regular maintenance easier and increases the period of use before any malfunctions occur. The pressure loss through the back flow preventer is minimized by providing a straight through flow path instead of the tortuous flow path of most back flow preventers. The device has coaxially aligned inlet and outlet openings and a straight through flow path with a pair of check valves located in the flow path. Both check valves open in the direction of the fluid flow and are spring biased to a normally closed position. The casing of the in-line back flow preventer has a removable top portion which, when removed, allows both check valve assemblies to be removed for maintenance and inspection without removing the casing from the water line and without disturbing the relief valve assembly. The retaining means for the removable check valves is internally located in central chamber of casing. The respective valve assemblies are constructed so as to prevent incorrect installation in the casing.

Should one or both of the check valves malfunction, a relief valve assembly is provided between the check valves to vent any water to atmosphere rather than allowing it to enter the water supply line. The relief valve is connected to, and actuated by a flexible diaphragm. The diaphragm, in turn, operates on the pressure differential between the inlet supply pressure and the pressure in the central chamber such that when the pressure differential goes below a predetermined point, indicating a potential back flow situation, the diaphragm opens the relief valve, thereby preventing water from entering the supply line.

During both static (no flow) and dynamic (normal flow) operating conditions of the back flow preventing valve, there are significant forces exerted on the check valve assemblies. For the check valve assembly to remain stationary, these forces have to be countered by forces exerted on the check valve assembly by the valve body through the retaining means. To appreciate the magnitude of these forces, consider a 3 inch back flow preventer valve which is subjected to a 150 psi pressure on its outlet side and zero pressure in the inlet side. (This is a potential back flow condition that the valve of this invention is specifically intended to protect against.) Assuming the sealing diameter of the 3 inch back flow preventer outlet check valve assembly is 3.87 inches, the resulting is an area exposed to the 150 psi pressure of 11.75 in$^2$. The force on the outlet check valve which has to be resisted by the check valve retaining means is 1760 lbs.

The retaining means shown in FIG. 2 of our copending application Ser. No. 890,964 is not adequate to consistently hold the check valve assembly stationary. Under the loading conditions, two distinct motions of the check valve assembly could occur. The check valve material, in line contact with the retaining means (a screwed pin) was overstressed, would thus yield and allow the valve assembly to move in the direction towards the central valve body chamber. The check valve assembly would also be forced to rotate (cock) under the action of the equivalent pressure force being exerted on the center line of the valve and the retaining force being exerted on the periphery of the valve. Due to this couple, the entire valve assembly would rotate and that section of the sealing O-ring, located diametrically opposite the retaining means (pin) would be pushed out of the bore in the body and no longer function as a seal.

To remedy these conditions, a retaining means which would hold the valve assembly over much of its periphery (approximately 300°) was devised. The retaining ring preferably used by this invention provides for a significant bearing area between it and the check valve assembly and between it and the valve body. The high stress conditions previously described between the retaining pin and the groove in the check valve assembly are eliminated. The support provided by the ring is symmetrical, thus the cocking or rotation of the check valve assembly under a downstream pressure condition is also eliminated. Thus, the reliability of the check valve assembly, as a sealing member, is greatly enhanced by using the ring as the retaining means.

The internally-located retaining ring has significant manufacturing advantages over the former externally-located retaining pin. A groove in the valve body, into which the retaining ring fits can be machined during the same operation that finishes the bore which accepts the check valve assembly. This eliminates the need to drill, counter-bore and tap the mating hole for the retaining pin. Internal location also inhibits random or deliberate tampering.

The ring as a retaining means also has a servability (ease of removal) advantage over the pin. The pin and the hole in the body into which it is screwed are in continuous contact with water, therefore corrosion is likely to occur. This would result in the pin being difficult to remove after a period of time. The retaining ring on the other hand, is in a more accessible area, is not as tightly fitted as would be a pin, can be handled with pliers and a screwdriver, and thus is easily removed even if corrosion did occur. Thus, the ease of serviceability is enhanced.

Finally, the ring as a retaining means has a reliability advantage over the retaining pin, since a potential leak path between the outlet chamber and the central chamber and between the central chamber and the inlet chamber by way of the pin threads and the short gasket distance between the pin screw head and the central chamber has been eliminated by the use of a retaining ring.

The preferred check valve seat and check valve assembly retaining means of this invention is composed of a check valve seat having a circular flange located about its outer periphery, the diameter of this flange being larger that the seat diameter on which is located the sealing member (e.g., an O-ring). The bore in the valve housing which accepts the check valve assembly comprises two diameters. The smaller diameter is that which contacts the sealing member on the check valve seat. The larger diameter is larger than the check valve seat flange diameter. The shoulder in the valve housing bore provided by the diameter change, together with the abutment flange on the check valve limits the inward position of the check valve assemblies within the valve housing. The larger diameter section of the valve housing bore contains a concentric groove which extends from the shoulder at the interface with the smaller bore diameter back towards the center cavity of the housing. The width of this groove, though less than the width of the larger diameter bore, is sufficient to receive the check valve flange width and also the width of a removable retaining member. Housing material remaining at the side of the groove opposite that abuting the seat flange prevents axial movement of the check valve assembly after the retainer enters the groove.

The retaining member is most preferably a wire ring of square cross section extending around the major portion of the inside of the groove to provide a relatively large contact area. The ends of this ring extends outwardly into the check valve chamber to facilitate removal of the ring. A space between the projecting ends of the ring is provided to permit squeezing them together to reduce the ring diameter for removal. A segment of the aforementioned housing material between the side of the groove and the check valve chamber is removed to provide a space for the extending ends of the retaining member.

The retaining member, though most preferably a square cross section ring, could be any expanding type of member that could be fit into the above-mentioned groove.

BRIEF DESCRIPTION OF THE DRAWINGS

In the drawings:

FIG. 4 is a partial sectional view of the back flow preventer of FIG. 1 taken along lines C—C;

FIG. 6 is a longitudinal sectional view of another back flow preventer of this invention.

DETAILED DESCRIPTION OF THE PREFERRED EMBODIMENTS

Figure 1:
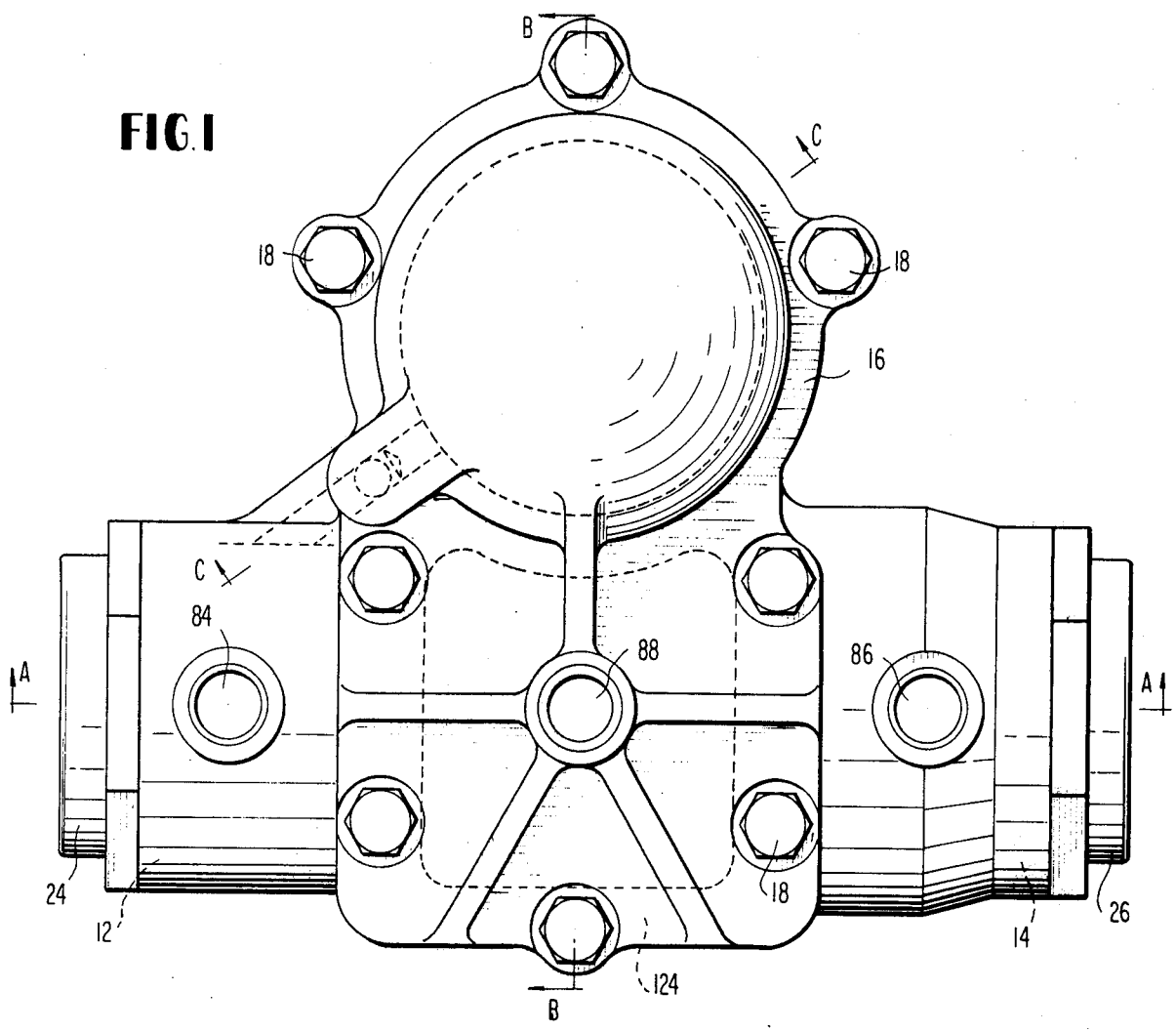
FIG. 1 is a top view of the back flow preventer according to the invention.

FIGS. 1 to 5 show a preferred embodiment of this invention usually used with a water pipe and the like having a diameter in the range of up to an inch or so. FIG. 6 shows a preferred embodiment of this invention usually used with a water pipe and the like having a diameter of 2 or more inches.

The back flow preventer of the embodiment of this invention shown in FIGS. 1 to 5 includes casing 10 having inlet 12 and outlet 14, and cover 16. Cover 16 is removably retained on casing 10 by bolts 18. Inlet 12 and outlet 14 are internally threaded as at 20 and 22, respectively, for engagement with inlet and outlet adaptors, 24 and 26. Adaptors 24 and 26 may be screwed into inlet 12 and outlet 14 to facilitate connecting the casing to appropriate diameter inlet and outlet pipes (not shown). The exact size of adaptors 24 and 26 will, of course, depend on the particular installation in which the back flow preventer is used. "O" rings 23 and 25 provide the requisite water tight sealing between the peripheries of inlet 12 and inlet adaptor 24, and outlet 14 and outlet adaptor 26, respectively.

Figure 2:
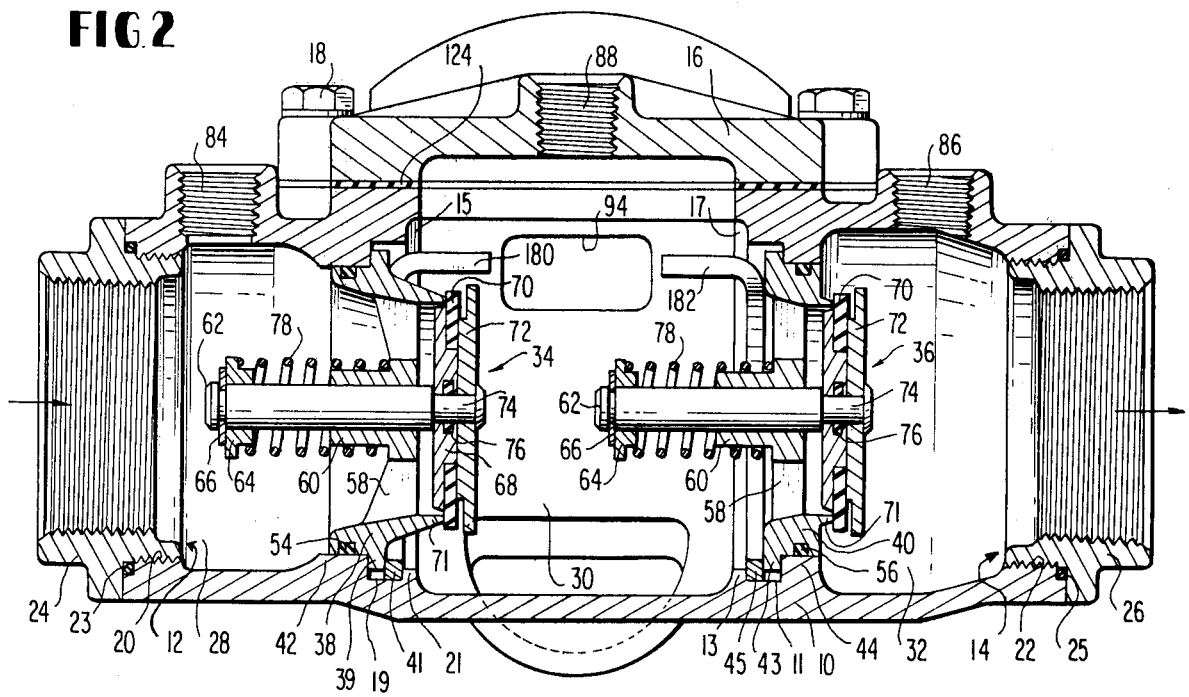
FIG. 2 is a longitudinal sectional view of the back flow preventer of FIG. 1 taken along lines A—A.

The interior of casing 10 defines inlet chamber 28, central chamber (cavity) 30 and outlet chamber 32. Inlet chamber 28 is separated from central chamber 30 by check valve assembly 34, and central chamber 30 is separated from outlet chamber 32 by check valve assembly 36. As can be seen in FIGS. 1 and 2, the three chambers (28, 30 and 32) are coaxially aligned and, when check valve assemblies 34 and 36 are open, form a straight through flow path for the water. The elimination of the tortuous flow path of the prior art back flow preventers serves to minimize the pressure drop between the inlet and outlet, and permits a higher flow capacity for a given valve size. Obviously, this allows a higher outlet pressure to be maintained for a given inlet pressure.

Figure 3:
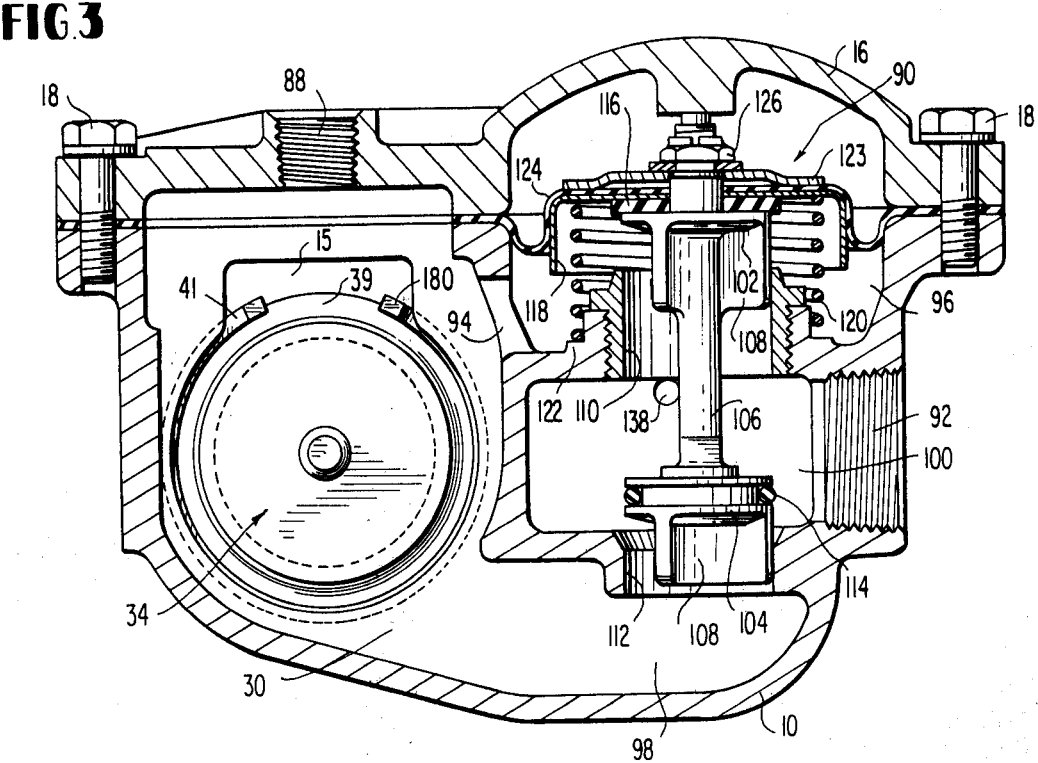
FIG. 3 is a transverse sectional view of the back flow preventer of FIG. 1 taken along lines B—B.

Valve seat 38 is removably retained on land 42 by inner rim (abutment flange) 39 of valve seat 38 and by retaining ring 41 (retaining means). Rim 39 and retaining ring 41 fit tightly in groove 19 of land 42, being retained therein by inner rim 21. The small diameter of the housing bore (forming land 42) and the adjacent shoulder in groove 19, together with abutment flange 19, limit the position of check valve assembly 34. FIG. 3 illustrates opening or breach 15 in inner rim 21 that occurs in the upper portion of thereof so that the outwardly protruding grip fingers 180 of retaining ring 41 can expand to hold check valve assembly 34 in place. Breach 15 also allows space for the forcing together of grip fingers 180 so that retaining ring 41 can be removed from groove 19. Rim 21 is housing bore large diameter material left after groove 19 has been formed (e.g., by machining). "O" ring 54 (check valve seat sealing member) provides the requisite water tight sealing between the peripheries of valve seat 38 and land 42.

Figure 5:
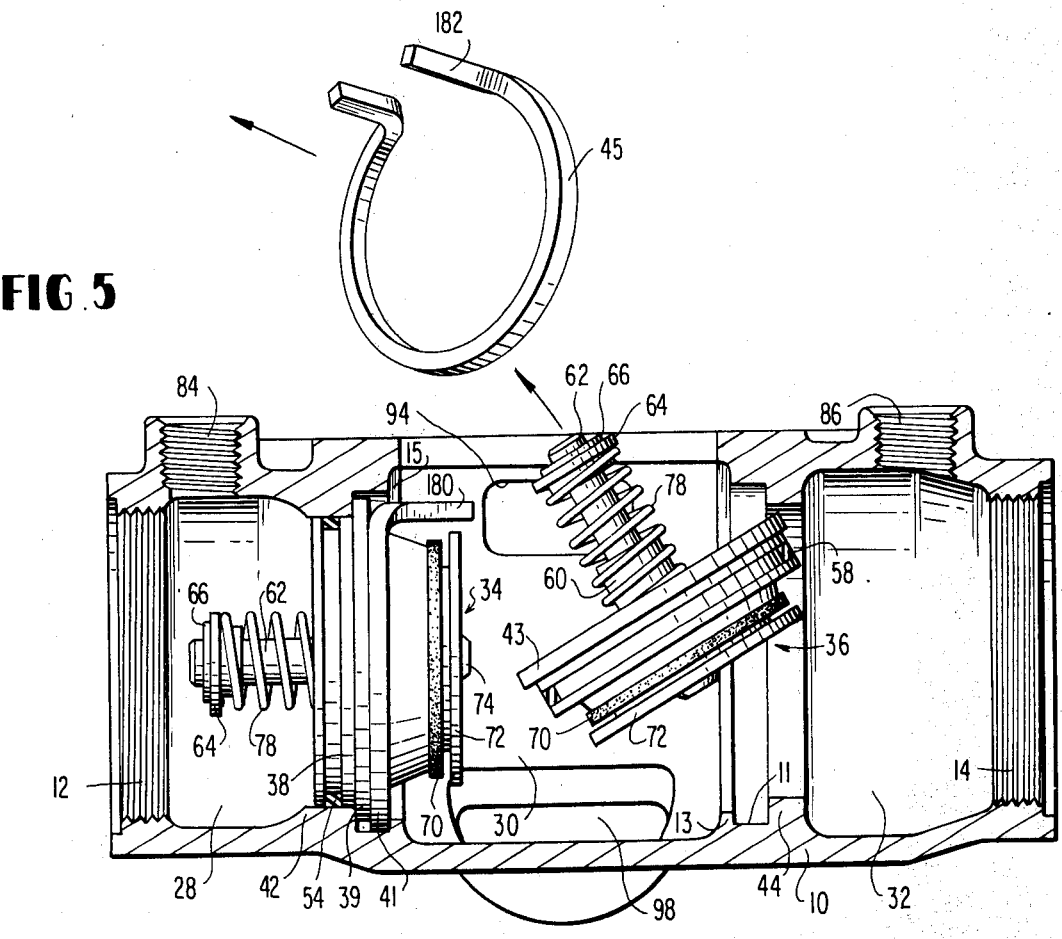
FIG. 5 is a longitudinal sectional view of the back flow preventer of FIG. 1 with one of the snap (retainer) rings and one of the check valve assemblies in a removal (or insertion) position.

Valve seat 40 is removably retained on land 44 by inner rim 43 (abutment flange) of valve seat 40 and by retaining ring 45. Rim 43 and retaining ring 45 fit tightly in groove 11 of land 44, being retained therein by inner rim 13. Opening or breach 17 in inner rim 13 occurs in the upper portion thereof so that outwardly protruding grips fingers 182 of retaining (snap) ring 45 can expand to hold check valve assembly 36 in place. Breach 17 also allows space for the forcing together of grip fingers 182 so that retaining ring 45 can be removed from groove 11-this then allows check valve 36 to be easily removed as illustrated in FIG. 5. Insertion of check valve 34 follows the reverse procedure illustrated in FIG. 5. (Breach 17 is where housing bore large diameter material 13 is removed to allow ends 182 to project into central chamber 30.) "O" ring 56 (check valve seat sealing member) provides the requisite water tight sealing between the peripheries of valve seat 40 and land 44.

Valve seat 38 has a plurality of circumferentially spaced, radially inwardly protruding legs 58 which support valve guide member 60. Any number of circumferentially spaced legs 58 may be used as long as the fluid flow through the valve seat is not unduly restricted.

Valve guide member 60 slidably supports valve stem 62 having spring retainer 64 attached to one end by retaining ring 66. Although a retaining ring engaging a peripheral groove is shown, any other suitable means to keep spring retainer 64 from sliding off the end of valve stem 62 may be used without exceeding the scope of this invention. On the opposite end of valve stem 62 is mounted disc 68, valve member 70 and backing plate 72. Valve member 70 is made of hard rubber or similar flexible material which will effectively stop the fluid flow when brought into engagement with flat lip 71 of valve seat 38. Disc 68, valve member 70 and backing plate 72 are rigidly attached to a reduced end portion 74 of valve stem 62 by deforming such end portion which protrudes beyond backing plate 72, as best shown in FIG. 2. Alternatively, reduced end portion 74 may be externally threaded and a nut used to hold disc 68, valve member 70 and backing plate 72 thereon. Obviously, any other means may be used to hold the aforementioned parts in assembled relationship without exceeding the scope of the invention. "O" ring 76 is placed around reduced portion 74 in a recess in disc 68 to prevent fluid leakage through the assembled valve. Compression spring 78 is interposed between spring retainer 64 and valve guide 60, as shown in FIG. 2, so as to normally bias valve member 70 against valve seat 38.

Valve assembly 36 is similar both in construction and operation to valve assembly 34 and, therefore, no detailed discussion is believed to be necessary except as follows. Valve seat 40 is not as wide as valve seat 38, which means protruding legs 58 of valve seat 40 are not as wide as protruding legs 58 of valve seat 38. "O" ring 56 is located before rim 43 of valve seat 40, whereas "O" ring 54 is located beyond rim 39 of valve seat 38. FIG. 2 clearly shows the construction differences.

Valve assemblies 34 and 36 cannot be assembled backwards in their respective ports because of the configuration of valve seats 38 and 40, respectively, will not allow such. Inadvertent assembly of check valve assembly 34 in place of check valve assembly 36 or vice versa can be prevented by making the external diameter of valve seats 38 slightly different from that of valve seat 40. Thus, either valve seat 38 or 40 would simply not fit into the opening intended for the other seat.

Casing 10 has internally threaded openings 84 and 86 therethrough, which openings communicate with chambers 28 and 32, respectively. A similar internally threaded opening 88 is provided in cover 16 to communicate with central chamber 30. These threaded openings may be connected to pressure gauges (not shown) or other pressure indicators or recorders to provide a visual indication of the water pressure in each chamber. If such visual indications are not desired, openings 84, 86 and 88 may be sealed by installing externally threaded plugs or stop cocks.

In the normal operating mode, check valve assemblies 34 and 36 are closed preventing any passage of water through the device. Normal water pressure in the supply line connected to inlet 12 is sufficient to overcome the force of the check valve springs and cause check valves 34 and 36 to open, thereby allowing water to flow to the outlet pipe (not shown). There will, of course, be a pressure drop as the water passes through check valves 34 and 36, but it will be minimized due to the straight-through nature of the flow path through the device.

Should the downstream pressure build up, while the inlet pressure remains relatively constant, the pressure differential across the check valves becomes smaller thereby allowing the check valve springs to close the check valves to prevent back flow through the device.

If the two check valve assemblies 34 and 36 worked perfectly, the aforedescribed device would serve to prevent back flow under any and all conditions. However, even a mechanism as simple and reliable as a check valve is subject to malfunctions (such as jamming open, foreign matter caught between the valve and valve seat, catastrophic failure of valve stem, etc.) which would render the aforedescribed device inoperative. It is of the utmost importance to prevent any possibility of malfunction since the water supply could be contaminated endangering other users of the water system.

The present device is rendered fail-safe by the inclusion of a diaphragm actuated relief valve connected between chamber 30 and a drain vent. As best seen in FIG. 3, relief valve assembly 90 is located in casing 10 displaced laterally from the axis of inlet 12 and outlet 14, and controls fluid flow out of drain vent 92. Chamber 30 communicates with valve assembly 90 via (i) passage 94 and chamber 96, and (ii) chamber 98 and port 112.

Relief valve assembly 90 comprises valve elements 102 and 104 interconnected by valve stem 106. Each of the valve elements 102 and 104 has a plurality of depending legs 108 which slidably bear against the sides of valve seat 110 and opening 112 to maintain the elements in coaxial alignment therewith during movement of the valve assembly. "O" ring 114 is provided in a peripheral groove in valve element 104 to provide the requisite sealing when element 104 is closed. Valve element 102 comprises valve disc 116 made of hard flexible material, such as rubber, and diaphragm piston 118. Valve disc 116 bears against valve seat 110, which is threadingly attached to casing 10, to shut off the fluid flow between chamber 96 and chamber 100. Compression spring 120 bears against inner casing wall 122 and diaphragm piston 118 to normally bias relief valve assembly 90 in an open position. Relief valve assembly 90 may be attached to diaphragm 124 via nut 126 threaded onto a portion of valve stem 106 which extends through an opening in diaphragm 124 and backing plate 123.

Diaphragm 124 is made integrally with the gasket which fits between casing 10 and cover 16, and prevents communication between chamber 96 and chamber 128. (The shape of integral gasket-diaphragm 124 is best shown by the dotted line in FIG. 1.) Chamber 128 is at the inlet pressure since it communicates with inlet chamber 28 via passage 130 in casing 10, shown in detail in FIG. 4. Chamber 96 is at relatively the same pressure as chamber 30 since it communicates therewith via passage 94. The force generated by the pressure differential between chamber 128 and 96 (caused by the pressure drop across check valve assembly 34) is great enough to overcome the force of spring 120 and maintain valve elements 102 and 104 in a closed position under normal operating conditions. Thus, in normal operation, no water passes out drain vent 92. However, when a downstream pressure build-up occurs, (assuming a malfunction of either of the check valves so that they fail to close as previously described) and the pressure differential between chamber 28 and 30 (and consequently between chambers 128 and 96) drops below a predetermined point, spring 120 causes relief valve assembly 90 to open. Once the relief valve opens, the water passes out drain vent 92 rather than back into the supply line thus avoiding contamination of the water supply. Drain vent 92 may be connected to a drain pipe (not shown) to direct the water away from the location of the back flow preventer.

Vent hole 138 is provided through the wall of casing 10 and allows communication between chamber 100 and the atmosphere. Thus, if the air gap required by the plumbing code in the drain pipe (not shown) connected to drain vent 92 should inadvertently become clogged, vent hole 138 acts as a secondary air gap to prevent development of negative pressure in chamber 100. Also, if the drain pipe should become clogged, the water flowing out of vent hole 138 would give a warning of this condition.

Although relief valve assembly 90 provides adequate protection should the check valve assemblies malfunction, this invention also by its construction provides means to minimize the chances of such a malfunction occurring. Backing plate 72 can contain a recessed annular portion adjacent to its periphery. If valve stem 62 and valve guide 60 should become worn enough to enable valve stem 62 to become skewed with respect to valve guide 60, such recessed portion would allow one side of valve member 70 to deflect so as to ensure the seating of valve member 70 on the entire circumference of valve seat 38. Backing plate 72 can have a peripheral flange spaced from the periphery of valve element 70 so as to allow water to pass into the annular space defined by the recessed portion. The build-up of downsteam water pressure, which cause the check valve to close, will assist in the seating of valve element 70 against valve seat 38 due to the water entering the annular space and acting against flexible valve member 70. A similarly shaped backing plate can be used on check valve assembly 36.

FIG. 5 illustrates the ease of removal and insertion of the check valve assemblies 34 and 36. FIG. 5 also shows the advantage of this invention of a smaller back flow preventer, which is a large savings in construction material alone.

FIG. 6 shows another preferred enbodiment of this invention. FIG. 6 is similar to FIG. 3. The embodiment of FIG. 6 is nearly the same as the embodiment of FIG. 3 except for the following enumerated differences. Entry into central chamber 30 is through a side port, enclosed by cover 140. "O"-ring 142 located in a peripherial groove in casing 10 provides the requisite watertight sealing between casing 10 and covering 140. Check valve assemblies 34 and 36 are inserted and removed through the side port covered by cover 140. In FIG. 6, it is seen that cover 16 does not extend over central chamber 30 and only covers the relief valve assembly. This embodiment therefore has two separate ports and covers (16 and 140). Diaphragm 124 does not extend over the top rim of area of central chamber 30 as in FIG. 3 as there is no top entry port in this embodiment. This embodiment is normally used with larger liquid flow pipes (usually at least 2 inches in diameter).

The pertinent portions of applicants' commonly-assigned U.S. application Ser. No. 890,964, filed on Mar. 28, 1978, is incorporated herein by reference.

What is claimed is:

1. A device for preventing the back flow of water from a point of use into a water supply line comprising:
   (a) a unitary casing having a water inlet opening, a water outlet opening and a drain vent opening, said water inlet and water outlet openings being coaxially aligned, the interior of said casing defining an inlet chamber, a central chamber and an outlet chamber, said chambers being coaxially aligned with each other and with said water inlet and water outlet openings to form a straight through flow path for the water, said interior of said casing also defining a drain vent chamber communicating with said drain vent opening and said central chamber, and said drain vent chamber being offset from said coaxially aligned inlet, central and outlet chambers;
   (b) a first check valve assembly removably attached to the interior of said casing between said inlet and central chambers, said first check valve being biased in a closed position to prevent the flow of water therethrough and opening to permit the flow of water therethrough when the water pressure in the water inlet chamber exceeds a predetermined level;
   (c) a first removable retaining means for retaining said first check valve assembly in said attached position, said first removable retaining means being located in said central chamber;
   (d) a second check valve assembly removably attached to the interior of said casing between said central and outlet chambers, said second check valve being biased in a closed position to prevent flow of water therethrough and opening to permit the flow of water therethrough when the water pressure in said central chamber exceeds a predetermined level;

(e) a second removable retaining means for retaining said second check valve assembly in said attached position, said second removable retaining means being located in said central chamber;

(f) a relief valve located within said casing interposed between said central chamber and said drain vent chamber, said relief valve being offset from said coaxially aligned inlet, central and outlet chambers, and said relief valve being biased in an open position;

(g) a flexible diaphragm attached to said casing and to said relief valve, one side of said diaphragm communicating with said central chamber and the other side of said diaphragm communicating with said inlet chamber, such that the normal pressure differential between said inlet and central chamber causes said relief valve to close thereby preventing water flowing from said central chamber to said drain vent chamber; and (h) a cover removably attached to said casing over an opening therein such that upon removal of said cover, said first and second check valve assemblies being removable from said casing interior without removal of said flexible diaphragm.

2. The back flow preventing device of claim 1 wherein said first check valve assembly comprises (a) a first valve seat having an external annular shoulder, (b) a first valve member movable between an open position wherein said first valve member is displaced away from said first valve seat and a closed position wherein said first valve member is in contact with said first valve seat, and (c) first biasing means to bias said first valve member to a normally closed position, said first removable retaining means comprising an expandable ring which has a gap therein and has a gripping arm on each end thereof which is located at a right angle to the plane of said expandable ring, and said interior attachment portion of said casing between said inlet and central chambers containing an annular groove, the rim or lip thereof facing said inlet chamber having an internal diameter less than the external diameter of said external annular shoulder of said first valve seat and the rim or lip thereof facing said central chamber having an internal diameter greater than the external diameter of said external annular shoulder of said first valve seat, and said expandable ring fitting in said groove so as to tightly hold said external annular shoulder in said groove and being removable from said groove upon compression thereof.

3. The back flow preventing device of claim 2 wherein said first biasing means comprises a compression spring.

4. The back flow preventing device of claim 2 wherein said first valve member comprises:
(a) a first valve stem slidably attached to said first valve seat;
(b) a first valve element of flexible material attached to an end of said first valve stem, said first valve element contacting said first valve seat when said first valve member is in a closed position; and
(c) a first backing plate attached to said end of said first valve stem, said first backing plate having a recessed portion adjacent to its periphery to allow deflection of said first valve element so as to ensure seating of said element against said first valve seat even if said first valve stem should becomed skewed with respect to said first valve seat.

5. The back flow preventing device of claim 1 wherein said second check valve assembly comprises (a) a first valve seat having an external annular shoulder, (b) a second valve member movable between an open position wherein said second valve member is displaced away from said second valve seat and a closed position wherein said second valve member is in contact with said second valve seat, and (c) second biasing means to bias said second valve member to a normally closed position, said second removable retaining means comprising an expandable ring which has a gap therein and has a gripping arm on each end thereof which is located at a right angle to the plane of said expandable ring, and said interior attachment portion of said casing between said central and outlet chambers containing an annular groove, the rim or lip thereof facing said outlet chamber having an internal diameter less than the external diameter of said external annular shoulder of said second valve seat and the rim or lip thereof facing said central chamber having an internal diameter greater than the external diameter of said external annular shoulder of said second valve seat, and said expandable ring fitting in said groove so as to tightly hold said external annular shoulder in said groove and being removable from said groove upon compression thereof.

6. The back flow preventing device of claim 5 wherein said second biasing means comprises a compression spring.

7. The back flow preventing device of claim 5 wherein said second valve member comprises:
(a) a second valve stem slidably attached to said second valve seat;
(b) a second valve element of flexible material attached to an end of said second valve stem, said second valve element contacting said second valve seat when said second valve member is in the closed position;
(c) a second backing plate attached to said end of said second valve stem, said second backing plate having a recessed portion adjacent to its periphery to allow deflection of said second valve element so as to ensure seating of said element against said second valve seat even if said second valve stem should become skewed with respect to said second valve seat.

8. The back flow preventing device of claim 1 wherein said relief valve comprises:
(a) a first relief valve seat removably attached to the interior of said casing;
(b) a second relief valve seat formed integrally with the interior of said casing;
(c) a first relief valve element movable between an open position wherein said first relief valve element is displaced from said first relief valve seat and a closed position wherein said first relief valve element contacts said first relief valve seat;
(d) a second relief valve element movable between an open position wherein said second relief valve element is displaced from said second relief valve seat and a closed position wherein said second relief valve element contacts said second relief valve seat;
(e) a valve stem connecting said first and second relief valve elements;
(f) means connecting said first relief valve element to said flexible diaphragm; and
(g) biasing means to normally bias said first and second relief valves in an open position.

9. The back flow preventing device of claim 1 wherein said biasing means is a compression spring.

10. The back flow preventing device of claim 1 wherein said flexible diaphragm is formed integrally with a gasket located between said casing and said cover, said gasket having an opening therethrough which allows removal of said check valve assemblies from said casing without disturbing said flexible diaphragm.

11. The back flow preventing device of claim 1 wherein said first and second check valve assemblies are of different size so as to not be interchangeable.

12. The back flow preventing device of claim 1 wherein said casing has a hole therethrough allowing communication between said drain vent chamber and ambient atmosphere, said hole functioning as a drain upon closing of said drain vent opening.

* * * * *